Nov. 8, 1938.  W. ERNST  2,136,239
PACKING RAM
Filed Sept. 5, 1935
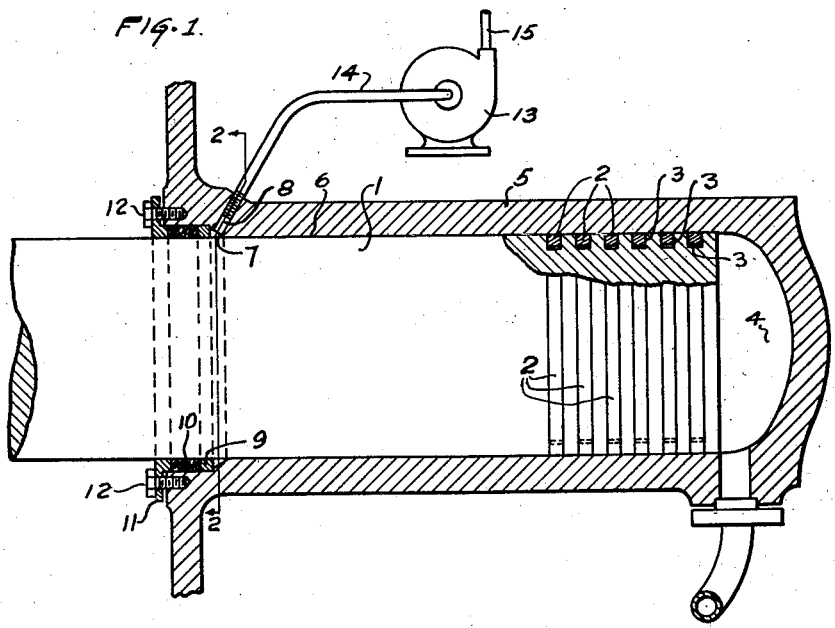
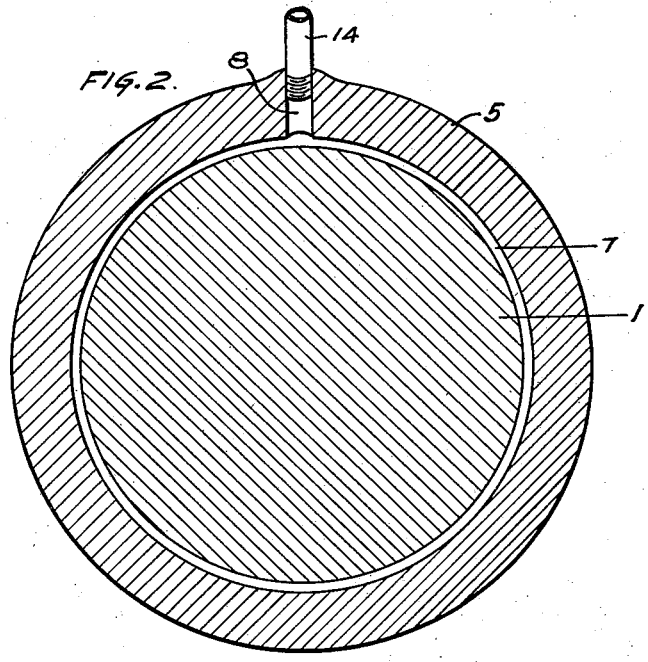
INVENTOR
WALTER ERNST.
BY
ATTORNEYS.

Patented Nov. 8, 1938

2,136,239

UNITED STATES PATENT OFFICE 2,136,239

PACKING RAM

Walter Ernst, Mount Gilead, Ohio, assignor, by mesne assignments, to The Hydraulic Press Corporation, Inc., Wilmington, Del., a corporation of Delaware Application September 5, 1935, Serial No. 39,311

2 Claims. (Cl. 121—1)

This invention relates to packing for high pressure rams.

It is the object of this invention to avoid the high pressure in the ram from coming into contact with the packing, as heretofore has been the custom and practice in the art. When packing is subjected to high pressure, it shows rapid wear and leakage and requires frequent replacement.

It is an object of this invention to provide a ram with metallic piston rings, such as cast iron, which is reasonably oil-tight, and to remove any leakage that gets past the rings by collecting the leakage in a groove and draining it from the collecting point by gravity or by a suction line of an auxiliary pump to draw off the leakage.

It is a further object to supplement this arrangement with an intermediate packing that is held in place by a packing gland so that high pressure never reaches the packing because the collecting groove carries atmospheric pressure only.

Referring to the drawing:

Figure 1 is a section through a cylinder and the packing construction of this invention.

Figure 2 is a section on the line 2—2 of Figure 1 looking in the direction of the arrows.

Referring to the drawing in detail, 1 designates a ram having cast iron piston rings 2 mounted in the grooves 3, which prevent the major portion of the leakage of the fluid under pressure in the chamber 4 of the piston 5.

Such fluid that does leak past the piston rings 2 and along the surface 6 of the ram 1 is collected in the annular, triangular-shaped groove 7 in the cylinder 5. This groove is connected with an outlet port 8 that is connected to the atmosphere so that the leakage can drain through 8 by gravity. One or more of such ports 8 are provided.

Forming the rear wall of the space 7 is a packing ring 9 and behind it is a packing 10 held in position by the packing gland 11, which in turn is retained in its position by the cap screws 12. The ring 9 and packing 10 thus perform a wiping action to keep the ram dry. Thus the high pressure never reaches the packing 10 because this high pressure fluid is removed and exhausted through the port 8 by reason of the collecting groove 7.

In some instances it is desirable to positively exhaust the fluid collecting in the groove 7 by attaching to the port 8 a pump 13 which is connected thereto by the line 14 and which discharges the fluid thus collected through the line 15.

It will be understood that I desire to comprehend within my invention such modifications as may be necessary to adapt it to varying conditions and uses.

Having thus fully described my invention, what I claim as new and desire to secure by Letters Patent, is:

1. In combination, a cylinder with a cylinder bore, a plunger reciprocable therein, leakage impeding piston rings on said plunger engaging the walls of said cylinder bore, an annular recess communicating with said cylinder bore immediately adjacent the outlet of said plunger therefrom, a port arranged to withdraw fluid from said recess, an annular wiping member surrounding and engaging said plunger adjacent said recess on the opposite side thereof from said cylinder bore, a packing beyond said annular wiping member engaging said plunger and said annular member, an adjustable packing-compressing element beyond said packing whereby pressure fluid leakage between the plunger and the cylinder bore past said leakage impeding piston rings will be removed through said recess and port before reaching and damaging said packing, said annular wiping member snugly engaging said plunger whereby to divert fluid thereon into said annular recess for removal through said port and thereby to assist in preventing leakage fluid from reaching said packing, and power-driven means connected to said port for positively exhausting therefrom the fluid collected therein.

2. In combination, a cylinder with a cylinder bore, a plunger reciprocable therein, leakage impeding piston rings on said plunger engaging the walls of said cylinder bore, an annular recess communicating with said cylinder bore immediately adjacent the outlet of said plunger therefrom, a port arranged to withdraw fluid from said recess, an annular wiping member surrounding and engaging said plunger adjacent said recess on the opposite side thereof from said cylinder bore, a packing beyond said annular wiping member engaging said plunger and said annular member, and an adjustable packing-compressing element beyond said packing, whereby pressure fluid leakage between the plunger and the cylinder bore past said leakage impeding piston rings will be removed through said recess and port before reaching and damaging said packing, said annular member consisting of a stationary ring of relatively incompressible material snugly engaging said plunger, and said packing consisting of relatively compressible material whereby to cause said annular member to divert the fluid on the plunger into the annular recess for removal through the port and thereby to assist in preventing leakage fluid from reaching said packing.

WALTER ERNST.